Jan. 21, 1969 D. W. McCULLOCH 3,422,827
VEHICLE WASHING SYSTEM
Filed March 22, 1967 Sheet 1 of 2

INVENTOR.
DOYLE W. McCULLOCH
BY Dunlap and Laney
ATTORNEYS

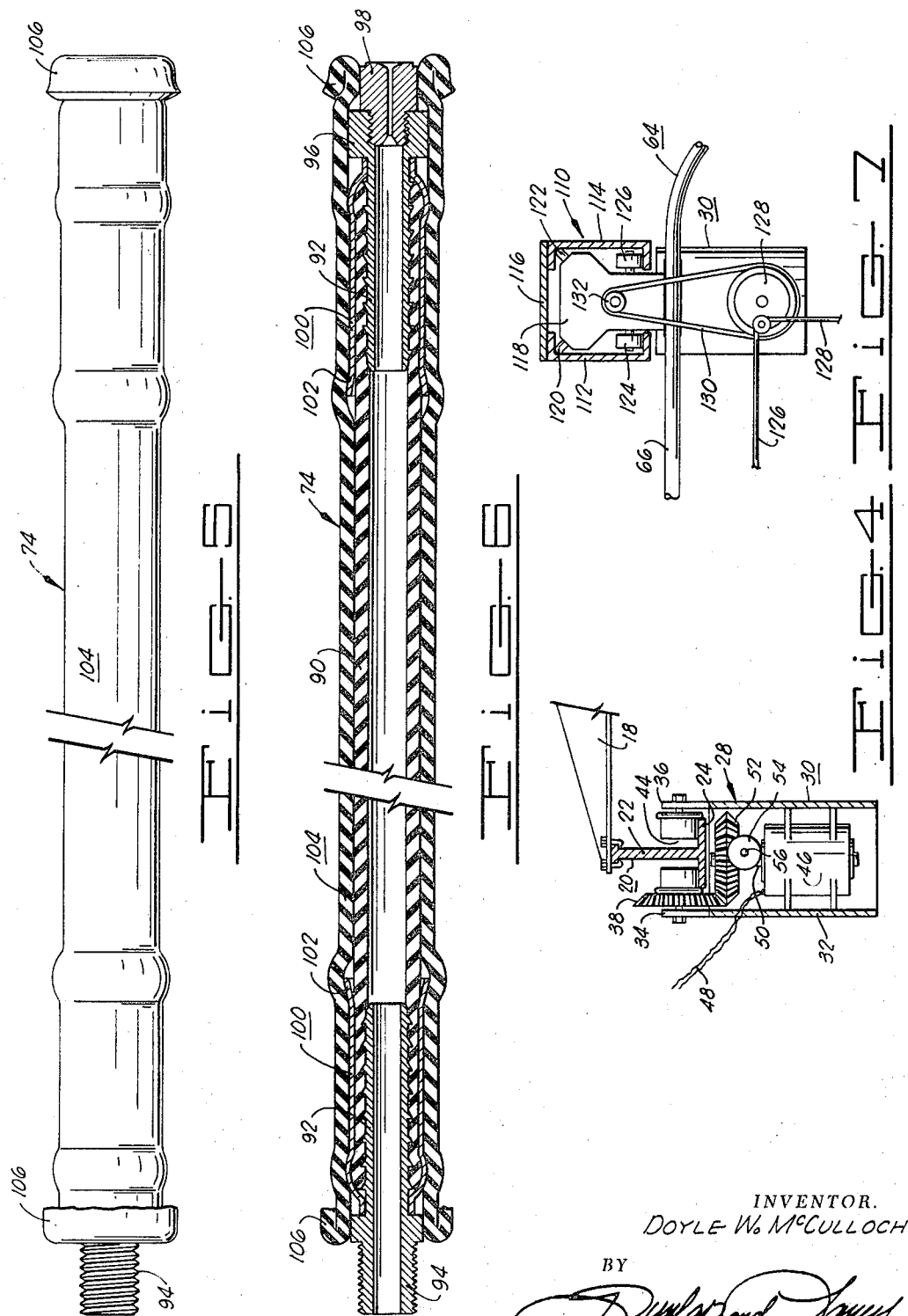

United States Patent Office 3,422,827
Patented Jan. 21, 1969

3,422,827
VEHICLE WASHING SYSTEM
Doyle W. McCulloch, 630 Walnut Circle E,
Garland, Tex. 75040
Filed Mar. 22, 1967, Ser. No. 625,040
U.S. Cl. 134—123                                                                 10 Claims
Int. Cl. B60s *3/02;* B08b *3/00;* B05b *15/06*

ABSTRACT OF THE DISCLOSURE

An automatic car wash system including a partially enclosed space which contains an elevated track on which a self-propelled carriage moves. The carriage supports a liquid supply manifold which moves with the carriage, and which feeds a washing liquid to a plurality of flexible, liquid dispensing conduits connected to the manifold. A plurality of flexible connecting rods are connected to the flexible liquid dispensing conduits, and to a member driven in rotation by the self-propelled carriage during is movement on the track. Eccentric connection of the flexible connecting rods to the rotated member imparts movement in various directions to the liquid dispensing conduits to assure maximum coverage of a car being washed using the system.

BACKGROUND OF THE INVENTION

Field of the invention

This invention relates to a system for automatically cleaning vehicles. More specifically, the present invention relates to a system for automatically washing automobiles, trucks or the like by directing cleaning fluids against such vehicles for the purpose of removing dust, grease and other deleterious materials from the exterior thereof.

Description of the prior art

In recent years, the practice of washing automobiles in an expeditious manner by the use of so-called automatic car washes has greatly expanded, and automatic car wash facilities of various types have been constructed in most urban locations. Substantially all of the automatic car wash facilities now in use comprise a building or similar enclosure into which a car may be driven, and a plurality of liquid dispensing conduits or pipes which direct streams of water, or water mixed with detergent, against the top, sides and bottom of the automobile.

Several difficulties continue to inhere in the operation of automatic car wash systems of the type described which in effect make the use of the systems less attractive to automobile owners, or make their operation less profitable to automatic car wash operators. One of the problems, for example, which has been characteristic of many automatic car wash systems now in use is that the piping conduits, nozzles, etc., from which the cleaning liquids are dispensed are constructed of metal, and are positioned in such a way that parts of the automobile may strike against the metal dispensing nozzles during the washing operation and become scarred or dented.

Another problem which affects both the efficiency of the washing of the automobile which can be attained, and the profit margin with which facilities of this type may be operated, is the mode of operation and expense of construction of many types of liquid dispensing systems in use. Thus, nozzles or dispensing heads which are rotated, oscillated or reciprocated in order to apply the dispensed liquid over a large area of the car have frequently been complicated and expensive. Moreover, the water pressure requirements which are involved in developing the necessary oscillating or rotating movements frequently place an unacceptably high demand upon the water supply system, or else require the washing facility to be operated at a pressure so low that inefficient cleaning of the automobile results. The mechanisms employed for developing the oscillating or reciprocating motion in dispensing heads or nozzles are also frequently mechanically complicated and of relatively short service life so that repairs to these mechanisms are necessarily frequent, and the expense of maintenance is higher than is desirable.

SUMMARY OF THE INVENTION

The present invention provides an improved automatic car washing system which can be employed for efficiently automatically washing passenger cars, trucks and the like in a relatively economical manner, and with no deleterious effects upon the vehicles being washed. Broadly described, the car washing system of the invention comprises the usual enclosure or confining structure which includes, as a minimum, a pair of parallel walls between which a vehicle may be driven. A track or carriage-supporting structure is disposed between the walls, and extends along at least one, and preferably both, of the walls. A liquid supply manifold pipe is movably supported on said track, and a plurality of flexible, liquid dispensing conduits are connected at spaced points along said manifold for receiving liquid therefrom. Self-propelled carriage means is provided in association with the track, and is secured to the liquid supply manifold pipe for moving the manifold pipe along the track so as to bring liquid issuing from the discharge end of the several flexible, liquid dispensing conduits to bear on various parts on the automobile. A plurality of flexible connecting rods each have one end eccentrically connected to a rotating member which is drivingly connected to the self-propelled carriage. Connected to the connecting rods at points spaced along the length thereof are the flexible, liquid dispensing conduits. The connecting rods function, when actuated by the rotating member, to move the flexible, liquid dispensing conduits in various directions in order to assure that liquid is discharged against all portions of the exterior of the automobile.

In a preferred embodiment of the invention, the track is suspended or supported above ground level, and the liquid supply manifold pipe is secured to the self-propelled carriage so as to provide a portion of the manifold pipe which extends substantially horizontally from the carriage, and a portion which extends downwardly therefrom. The carriage includes a motor which drives wheels or rollers in rolling engagement with the track, and which also, through appropriate gearing. belts and the like, drives in rotation, a member to which are eccentrically attached the connecting rods hereinbefore described. Although in its simplest form, the car wash system of the invention may include but a single one of the connecting rods, it is preferred to utilize two or more of these rods, each connected at one of its ends to a point eccentrically located on the member rotated by the carriage motor. One of the rods extends downwardly and the other horizontally, and each is detachably connected to one or more of the flexible, liquid dispensing conduits. The latter conduits are constructed of a highly flexible material able to withstand high pressures, and are covered externally by a relatively soft resilient material which protectively enshrouds all of the metal portions of the conduits.

An object of this construction is to prevent damage to vehicles which may contact these dispensing conduits during the washing operation.

Another object of the invention is to eliminate bearing structures which are ordinarily provided in the dispensing heads or nozzles of automatic car washing systems for the purpose of accommodating oscillating, rotating or reciprocating motion by the nozzles.

An additional object of the invention is to provide an automatic car washing system which does not depend upon fluid pressure to drive the liquid dispensing elements of the invention in a sweeping or other motion to discharge a cleaning fluid against a maximum surface area of the vehicle being cleaned.

Another object of the invention is to provide an automatic vehicle washing system which is mechanically simpler in its construction than many such systems which have heretofore been in use, and which is therefore characterized in having a longer and more trouble-free operating life than such previous systems.

In the attainment of the foregoing more specific objects, the invention permits realization of the overall and broader objects of providing a more efficient automatic vehicle washing system which is less expensive to operate and maintain, and which does not harm and damage in any way vehicles being washed.

Other advantages inhere in, and desired objects are attached by, the invention, and these will become manifest as the following detailed description of the invention is read in conjunction with the accompanying drawings which illustrate the invention.

*Brief description of the drawings*

FIGURE 4 is a vertical sectional view through the carriage used in the system for purposes of illustrating the prime mover and gearing included in the carriage.

FIGURE 5 is a view in elevation of one of the flexible liquid dispensing conduits utilized in the car washing system of the invention.

FIGURE 6 is a longitudinal sectional view through the liquid dispensing conduit depicted in FIGURE 5.

FIGURE 7 is a detail view illustrating the manner in which the connecting rods are detachably connected to the liquid dispensing conduits.

*Description of the preferred embodiment*

Figure 1:
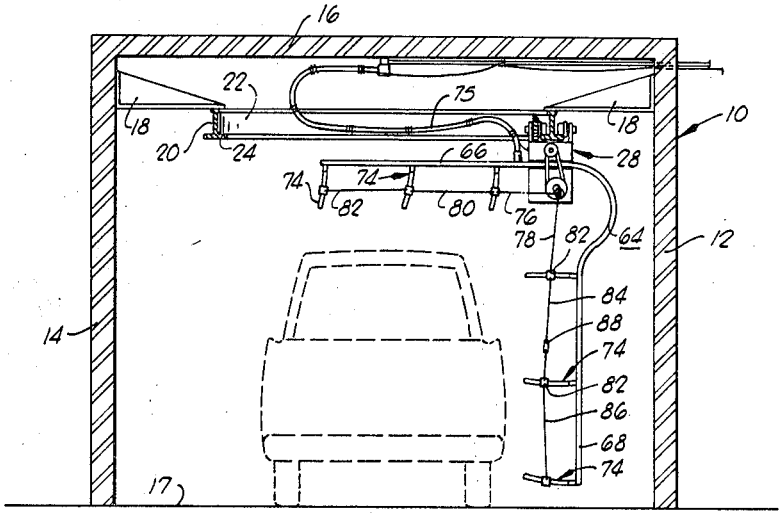
FIGURE 1 is a view in elevation of the automatic vehicle washing system of the invention, but showing in section, the walls and ceiling of a building in which the washing system is housed.

In the drawings, systems or broad combinations comprising a plurality of subcombinations are designated by reference numerals having lead lines with arrowheads. Subcombinations are designated by reference numerals which are underlined, and individual elements of structure are designated by plain reference numerals and lead lines.

Referring now to the drawings, and initially to FIGURE 1, an enclosure or building which is used to house the automatic vehicle washing system of the invention is designated generally by reference numeral 10. The building includes a pair of vertically extending, substantially parallel side walls 12 and 14, and a ceiling 16 which extends between, and interconnects, the top of the two side walls. The base of the side walls 12 rest upon a floor 17. A plurality of supporting braces 18 are bolted or otherwise suitably secured to the side walls 12 and 14 near the top of these walls and project horizontally outward therefrom. The braces 18 function to support a track 20 which, in the illustrated embodiment of the invention, is formed in a closed, generally rectangular configuration having rounded corners, and is constructed of a metallic channel material which is in the shape of an inverted T in cross-section. The track 20 thus has a vertically extending web 22 and a horizontally extending flange 24 secured to the lower edge of the web. The area encompassed by the track 20 is sufficient to accommodate an automobile which can be driven between the side walls 12 and 14 of the enclosure 10 so as to be positioned below the track 20, and within vertical planes projected downwardly therefrom.

Supported by the track 20 and movable thereon is a self-propelled carriage designated generally by reference numeral 28. The self-propelled carriage 28 includes a housing 30 having a plurality of side walls 32, and having a pair of vertically extending flanges 34 and 36 secured to the upper portion of the housing. The flanges 34 and 36 are horizontally spaced from each other by a distance permitting them to pass on the opposite sides of the horizontally extending flange 24 which forms a portion of the track 20. Secured in the flange 34 is a stub shaft 36 which has journaled thereon a bevel gear 38 ond a roller 40 which is positioned to bear against, and roll upon, the flange 24 of the track 20. An idler roller 42 is journaled on a shaft 44 secured to the flange 36, and is positioned to bear against the horizontally extending flange 24 of the track 20 on the opposite side of the web 22 from the roller 40.

As most clearly illustrated in FIGURE 4, the housing 30 of the carriage 28 encloses an electric motor 46 supplied with electric power from leads 48, and having a drive shaft 50 projecting therefrom. The drive shaft 50 carries a bevel gear 52 which engages the bevel gear 38 and also drivingly engages a bevel gear 54 which is keyed to a shaft 56 extending through a wall 32 of the housing 30. It will be noted that the wall 32 through which the shaft 56 projects extends substantially normal to the walls 12 and 14 of the enclosure 10, and that the shaft 56 extends parallel to the direction of travel of an automobile through the enclosure. The shaft 56 is further keyed to a pulley 58 which, through a belt 60, drives a pulley or sheave 62 which is journaled on the lower portion of the housing 30.

An elongated, liquid supply manifold pipe 64 is bent into a generally L-shaped configuration, and is secured by welding or other suitable means to a side 32 of the housing 30 so that one leg or branch 66 of the manifold pipe extends horizontally and in a direction substantially normal to the walls 12 and 14 as depicted in FIGURE 1, and the other leg or branch 68 extends vertically downwardly from the carriage 28. The branches 66 and 68 of the manifold pipe 64 are provided with threaded liquid outlets or fittings 72 which permit connection to the manifold pipe of a plurality of flexible liquid dispensing conduits designated generally by reference numeral 74. The construction of the flexible liquid dispensing conduits 74 will be hereinafter explained in greater detail. A flexible liquid supply line 75 is connected to a central portion of the manifold pipe 64 for the purpose of supplying cleaning liquid thereto, and it will be noted that the dispensing conduits 74 are equally distributed on opposite sides of the supply line connection to the manifold pipe to assure discharge pressure equilization.

For the purpose of imparting an oscillating motion to the liquid dispensing conduits 74, a plurality of connecting rods are utilized for interconnecting the conduits with the belt driven pulley 62. Thus, a pair of elongated, flexible connecting rods 76 and 78 are pivotally connected to a pin or post 80 which is secured to an outer peripheral portion of the pulley 62, and is disposed eccentrically with respect to the axis of rotation thereof. The elongated flexible connecting rod 76 extends generally horizontally from the pin 80 and is connected at its opposite end to a detachable clamp block 82 which is secured around a central portion of the flexible fluid dispensing conduit 74 which is closest to the carriage 28. The detachable clamp block 82 is, in the illustrated embodiment, of two part construction (see FIGURE 7), and screws or other suitable fastening means are provided for quickly fastening the two parts of the clamp block together so as to engage the flexible liquid dispensing conduit 74. The connecting rod 78 extends vertically downwardly and is connected at its end opposite the pin 80 to one of the clamp blocks 82 which engages a central portion of the first flexible fluid dispensing conduit 74 on the branch 68 of the manifold pipe 64.

In addition to the connecting rods 76 and 78, additional connecting rods designated by reference numerals 80, 82, 84 and 86 in FIGURE 1 are used for interconnecting the remaining fluid dispensing conduits 74 to the pulley 62 through the connecting rods 76 and 78. In each instance, the detachable clamp blocks 82 are employed for permitting the connecting rods to be quickly connected and disconnected from the respective flexible liquid dispensing conduits 74. The connecting rods employed for interconnecting the flexible liquid dispensing conduits 74 to the pin 80 on the pulley 62 are preferably sufficiently flexible that they may be easily manually bent to change at will the spacing or orientation of the several liquid dispensing conduits 74 relative to each other. It is also preferred to include in one or more of the connecting rods a turnbuckle such as the turnbuckle 88 depicted in FIGURE 1.

The construction of the liquid dispensing conduits 74 is illustrated in detail in FIGURES 5 and 6. Each of the liquid dispensing conduits includes an elongated, relatively heavy walled, high pressure tubing 90 which is able to withstand high liquid pressures without rupturing. The high pressure tubing 90 has each of its opposite ends pressed over a serrated nipple 92 with the serrated nipple at one end of the high pressure tubing being formed integrally with an externally threaded male connector 94 for threadedly engaging the flexible liquid dispensing conduit 74 with a fitting 72 of the manifold pipe 64. The serrated nipple 92 at the other end of the high pressure conduit 90 is connected to, or formed integrally with, an internally threaded female socket 96 into which a small dispensing head or nozzle 98 is threaded.

In order to firmly engage the internal wall of the high pressure tubing 90 with the serrations formed externally on the serrated nipples 92, a pair of soft metal sleeves 100 are pressed over the high pressure tubing 90 in concentric relation to the serrated nipples 92, and are then compressed or crimped inwardly so as to force the serrations of the nipples 92 to bite into and impale the high pressure tubing 90. It will be noted that the soft metal pressure tubing 90. It will be noted that the soft metal sleeves 100 are belled outwardly at their inner ends 102 so that when the flexible fluid dispensing conduits 74 are flexed through a relatively great angle, extreme wear and a cutting action does not occur as a result of the forcing of the high pressure tubing 90 against the end edges of the soft metal sleeves.

As a final element utilized in the construction of each of the fluid dispensing conduits 74, a soft flexible protector sleeve 104 which may suitably be constructed of soft rubber or the like is placed over the entire assembly in a concentric fashion so that the protector sleeve extends from one end of the dispensing conduits 74 substantially to the other, leaving only the externally threaded male connector 94 exposed. In a preferred construction of the invention, cuffs or collars 106 are turned back at the ends of the protector sleeve 104 to provide an additional cushioning effect at these locations. It will be noted in referring to FIGURE 6 that the dispensing nozzle 98 has its sides fully covered and protected by the soft flexible protector sleeve 104 and by the collar 106 which is turned back thereon. As will be hereinafter explained, there is thus provided no opportunity for damage to the exterior surface of vehicles being washed in the system of the present invention as a result of contact with the metal dispensing nozzles 98.

Figure 2:
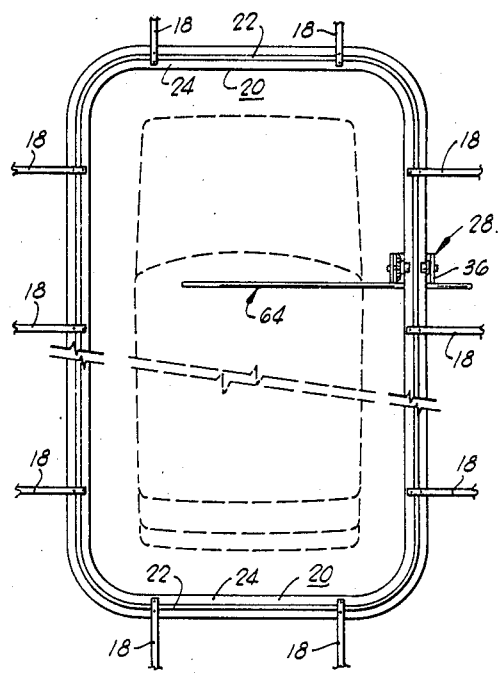
FIGURE 2 is a plan view of the automatic vehicle washing system of the invention.

In the operation of the automatic vehicle washing system of the invention, the carriage 28 may be assumed to initially be located adjacent the bend in the track 20 which is shown in the lower right hand portion of FIGURE 2. As an automobile then enters the enclosure 10 from one side thereof, assumed here to be equivalent to the lower portion of FIGURE 2, the automatic vehicle washing system is energized, either through placement of coins in a coin operated switch, through the interruption of a light beam in a photoelectric switching system as the car moves into the enclosure, or by some other suitable means. When the car is in position, that is, is centered in the generally rectangular enclosure defined by the projection o fthe track 20 in a vertical direction, the carriage 28 is started along the track 20 by energization of the motor 46. Simultaneously, a suitable washing liquid, which may be, for example, water, or water having detergent added thereto, is introduced to the manifold pipe 64 from the liquid supply line 75. The washing liquid moves into the legs 66 and 68 of the manifold pipe 64, and from these legs is dispensed through the several flexible dispensing conduits 74. It will be noted that a group of these conduits points in a generally horizontal direction and that the conduits in this group are vertically spaced from each other and thus are best adapted for directing the washing liquid against the side and lower portion of the vehicle. Another group of the flexible liquid dispensing conduits 74 is directed downwardly and will deliver the washing fluid to the top of the vehicle.

As the carriage 28 moves along the track 20, the belt 60 drives the pulley 62 in rotation, and this rotational movement of the pulley effectively imparts an oscillating motion to the connecting rods 76 and 78 which are connected to the eccentric pin 80 on the pulley. Thus, an oscillating up-and-down motion is imparted to the flexible liquid dispensing conduits 74 which extend from the leg 68 of the manifold pipe 64 in a substantially horizontal direction, and a sideways oscillating motion is imparted to the flexible liquid dispensing conduits 74 which extend downwardly from the leg 66 of the manifold pipe 64. In this fashion, the sides, top, and to some extent, the bottom of the vehicle are thoroughly swept with washing liquid delivered from the oscillating, flexible liquid dispensing conduits 74. Essentially complete coverage of the automobile is attained.

This motion of the flexible dispensing conduits 74 continues as the carriage 28 continues to move along the track 20. Movement of the carriage 28 along the track 20 carries it to one of the lateral legs of the track, such as the top portion of the track depicted in FIGURE 2, and in this position, the discharged washing liquid impinges against either the front or the rear of the automobile, and effects a thorough cleaning thereof. Eventually, the carriage 28 completes a circuit of the track 20 so that it has travelled completely around the vehicle and directed the cleaning liquid against all portions of the vehicle. The cycle may then be repeated, or the washing operation may be terminated with one circuit of the track 20 if the desired degree of cleaning is effected during this time.

As the flexible liquid dispensing conduits 74 are oscillated up and down and sideways, no opportunity exists for metal portions of these elements to come in contact with the painted surface of the automobile. All exposed metal surfaces which can possibly contact the vehicle are protectively covered with the soft, flexible protector sleeves 104.

It is also important to note that oscillation of the flexible liquid dispensing conduits 74 is effected without the necessity for any sophisticated or mechanically unreliable bearing structures, and no reliance upon liquid pressure is required to achieve such oscillation. No valving or other intricate driving elements are included in the liquid supply path to the flexible liquid dispensing conduits 74, and they are therefore capable of trouble-free operation for at least as long as any of the other parts of the system.

Figure 3:
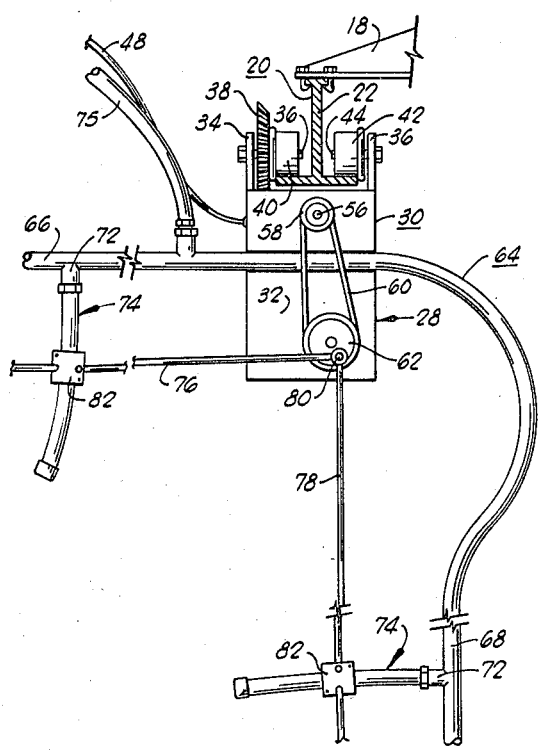
FIGURE 3 is a detail view of a portion of the automatic vehicle washing system of the invention, such detail view illustrating a portion of the track used in the system, the carriage which moves on the track, and the manner in which a liquid supply manifold is secured to this carriage for movement therewith. The detail view further illustrates the structure used to drive the connecting rods to procure movement of the several flexible liquid dispensing conduits which are included in the system.

In FIGURE 7 of the drawings, a preferred embodiment of a carriage and track assembly which may be utilized in the invention is illustrated. It will be noted that the track, designated generally by the reference numeral 110, includes a pair of channel member 112 and 114 which are secured to each other by a plate 116 extended across the top thereof. A housing 118 of the carriage of this embodiment of the invention is positioned in the track 110, and carries two sets of idler wheels which extend diagonally outwardly and upwardly therefrom at a 45-degree angle. Two of the idler wheels 120 and 122 may be seen in FIGURE 7 of the drawings. The housing 118 also supports a pair of drive wheels 124 and 126 which bear against the horizontally extending flanges at the lower sides of the track 110 and function to propel the carriage along the track. A motor housing 30 similar or identical to that depicted in FIGURE 3 may be employed in the carriage shown in FIGURE 7, and this motor housing supports a sheave or pulley 128 which is driven in rotation by a belt 130 from a suitable pulley 132. The connecting rods 76 and 78 are connected eccentrically to the pulley 128 as hereinbefore described.

Several advantages accrue from the use of the preferred track and carriage assembly depicted in FIGURE 7. Thus, both the idler rollers 120 and 122, and the drive rollers 124 and 126 are protected from excessive contact with moisture and water due to the surrounding and enclosing character of the track 110. The necessity to use water resistant bearings in supporting the shafts of the rollers is therefore obviated, and relatively simple and inexpensive bearings can be used, and are characterized in having a long and trouble free service life by reason of the exclusion of water from the interior of the track. With the type of track construction depicted in FIGURE 7, it will be apparent that a removable section (not shown) must be provided in the track in order to permit the carriage to be inserted and removed therefrom for repairs and the like.

Another advantage of the carriage and track arrangement depicted in FIGURE 7 is that it corners better— that is it may be moved around the radiused corners of the closed, generally, rectangular track with less difficulty than many types of track-carriage assemblies. Also, in excluding a great deal of the water from the interior of the track and from the moving parts of the carriage drive system which is housed in the housing 118, there is little opportunity for grease or oil to drip down from the track and carriage onto the top of an automobile which has just been washed.

From the foregoing description of the invention, it will have become apparent that the present invention provides an improved vehicle washing system which can be economically operated, but which effects a highly efficient cleaning of automobiles, trucks and similar vehicles which may be placed in the system. The system is perfectly safe to operate from the standpoint of any surface damage to the automobile occurring, and very little maintenance or repair is required in achieving continuous operation of the system over long periods of time.

Although a preferred embodiment of the invention has been illustrated and described in the foregoing specification and the accompanying drawings, it will be understood that certain basic principles which are identified in the discussion, and which constitute the true basis for the present invention may be incorporated in other systems which are structurally at variance with the precise structure characterizing the exemplary embodiment herein disclosed. All such modifications and variations which do not relinquish the use of the basic principles of this invention are therefore deemed to be circumscribed by the spirit and scope of the invention except as the same may be necessarily limited by the appended claims or reasonable equivalents thereof.

What is claimed is:
1. In a vehicle washing system of the type comprising an overhead track and a carriage movable on said track, the improvement comprising:
    a liquid manifold pipe connected to said carriage and movable with said carriage;
    a plurality of flexible liquid dispensing conduits connected to said manifold pipe for receiving washing liquid therefrom;
    means driven by said carriage during its movement and connected externally to said flexible liquid dispensing conduits for moving said conduits to change the direction towards which washing liquid is discharged therefrom; said means driven by said carriage comprising, a rotating member being connected to said carriage so that movement of the carriage on the track concurrently drives said rotating member in rotation; and at least one connecting rod connected to said rotating member and to said flexible liquid dispensing conduits for moving said liquid dispensing conduits in an oscillating movement as said rotating member is rotated.

2. The improvement in a vehicle washing system as defined in claim 1 wherein each of said liquid dispensing conduits comprises:
    a central liquid-carrying tubing having a dispensing nozzle connected to one end thereof, and having connector means connected to the other end thereof for connecting the liquid dispensing conduit to said manifold pipe; and
    a soft, flexible protector sleeve around said tubing and covering at least said dispensing nozzle.

3. The improvement in a vehicle washing system as defined in claim 2 wherein said nozzle and connector means are each secured to externally serrated nipples pressed into the opposite ends of said tubing, and wherein said dispensing conduits each further include metal sleeves around opposite ends of said tubing and positioned concentrically with respect to said serrated nipples, said metal sleeves being pressed radially inwardly to impale said tubing on the serrations of said nipples, and each of said metal sleeves having a belled end at its end furthest from the nearest end of said tubing.

4. The improvement in a vehicle washing system as defined in claim 1 wherein said manifold pipe is secured to said carriage and includes a vertically extending leg and a horizontally extending leg, and wherein said system is further characterized to include a flexible liquid supply line connected to said manifold pipe, and said system has an equal number of said dispensing conduits connected to said manifold pipe on opposite sides of the connection thereto of said supply line.

5. The improvement in a vehicle washing system as defined in claim 1 wherein said carriage includes
    an electric motor;
    rollers engageable with said track and drivingly connected to said motor;
    and wherein said rotating member comprises a pulley drivingly connected to said motor.

6. The improvement in a vehicle washing system defined in claim 5 wherein said connecting rods are manually flexible rods and are each detachably connected to at least one of said flexible liquid dispensing conduits.

7. The improvement in a vehicle washing system as defined in claim 6 and further characterized to include additional connecting rods detachably interconnecting pairs of said liquid dispensing conduits.

8 The improvement in a vehicle washing system as defined in claim 7 wherein each of said flexible liquid dispensing conduits comprises:
    a central liquid-carrying tubing;
    a dispensing nozzle;
    a serrated nipple secured to said dispensing nozzle and projecting into one end of said tubing;

connector means for connecting said tubing to said manifold pipe;

a second serrated nipple secured to said connector means and projecting into the other end of said tubing;

metal sleeves surrounding the end portions of said tubing and forcing the tubing into the serrations on said nipples; and a rubber protector sleeve around said tubing, surrounding said metal sleeves and covering said dispensing nozzle.

9. The improvement in a vehicle washing system as defined in claim 8 wherein each of said metal sleeves is characterized in having a belled end at its end furthest from the nearest end of said tubing.

10. The improvement in a vehicle washing system as defined in claim 9 wherein said manifold pipe is secured to said carriage and includes a vertically extending leg and a horizontally extending leg, and wherein said system is further characterized to include a flexible liquid supply line connected to said manifold pipe, and said system has an equal number of said dispensing conduits connected to said manifold pipe on opposite sides of the connection thereto of said supply line.

References Cited

UNITED STATES PATENTS

| | | | |
|---|---|---|---|
| 1,756,066 | 4/1930 | Pineles. | |
| 2,712,320 | 7/1955 | Schroeder et al. | 134—123 |
| 2,756,759 | 7/1956 | Swain | 134—123 XR |
| 2,896,857 | 7/1959 | Tompkins | 134—123 XR |
| 3,167,977 | 2/1965 | Hergonson | 134—123 XR |
| 3,261,369 | 7/1966 | Thiele | 134—123 |
| 3,289,238 | 12/1966 | Sorenson et al. | 134—123 XR |
| 3,391,701 | 7/1968 | Richardson et al. | 134—123 |

ROBERT L. BLEUTGE, *Primary Examiner.*

U.S. Cl. X.R.

134—181; 239—209, 588, 602